United States Patent

Dixon

[15] 3,707,202
[45] Dec. 26, 1972

[54] OIL FILTER IN CRANKCASE PAN

[72] Inventor: Roy H. Dixon, 17950 Holland Road, Brookpark, Ohio 44142

[22] Filed: July 31, 1970

[21] Appl. No.: 60,058

[52] U.S. Cl..............184/6.24, 123/196 A, 210/168
[51] Int. Cl................................................F16n 39/06
[58] Field of Search ............210/168; 184/6.24, 6.25; 123/196 A

[56] References Cited

UNITED STATES PATENTS

| | | | |
|---|---|---|---|
| 2,376,418 | 5/1945 | Clark et al. | 184/6.24 X |
| 2,306,823 | 12/1942 | Meldrum | 184/6.24 X |
| 1,671,391 | 5/1928 | Winslow et al. | 184/6.24 X |
| 1,868,055 | 7/1932 | Edwards | 184/6.24 |

FOREIGN PATENTS OR APPLICATIONS 1,183,750  12/1964  Germany...................123/196 A Primary Examiner—Manuel A. Antonakas
Attorney—H. E. Whitaker

[57] ABSTRACT

An external recess is formed in an oil pan so that an oil filter may be easily replaced therein. The filter is threadably engaged on a conduit. A gasket cooperates with the filter housing and an inlet means in the pan wall such that the oil travels from the pan to the filter and conduit then to the oil pump.

3 Claims, 5 Drawing Figures

PATENTED DEC 26 1972 3,707,202
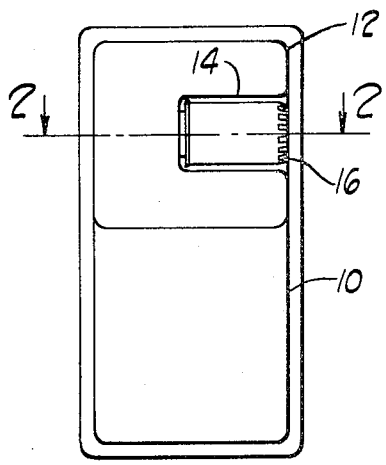
Fig. 1
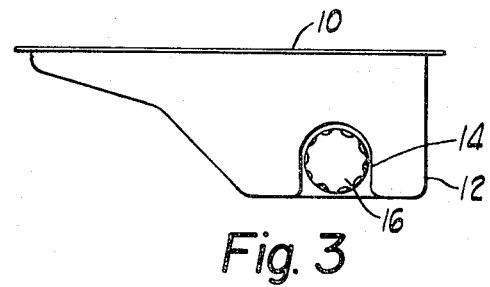
Fig. 3
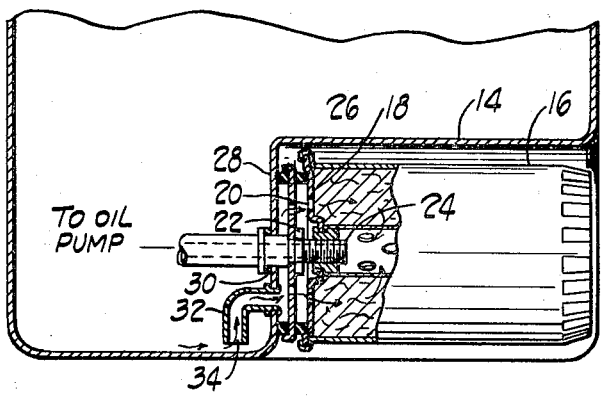
Fig. 2
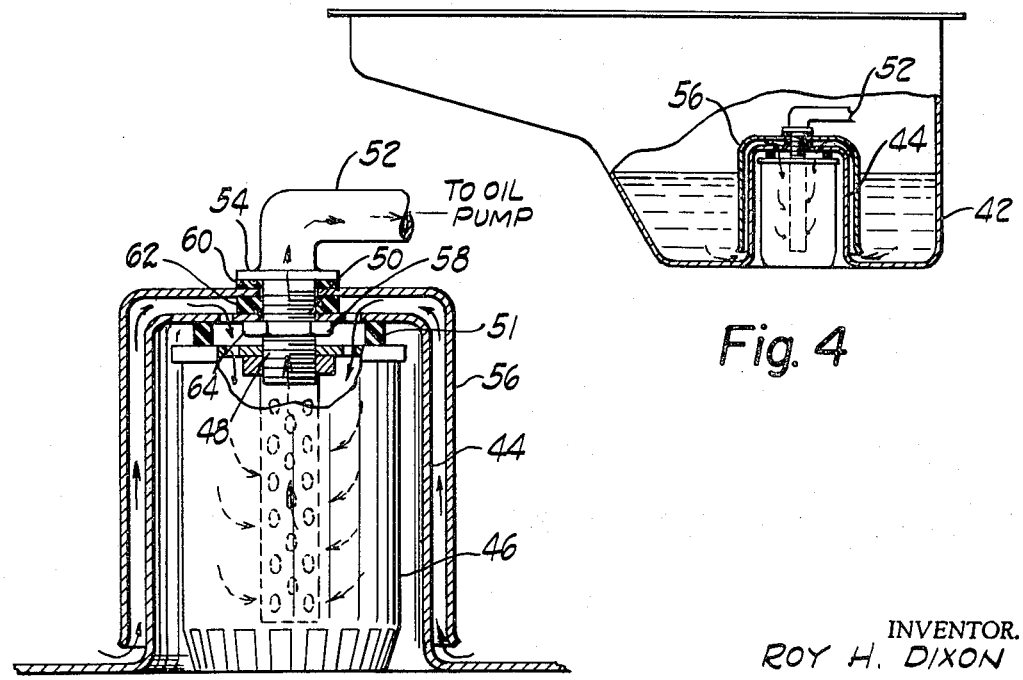
Fig. 4
Fig. 5
INVENTOR.
ROY H. DIXON
BY
H.E. Whitaker
ATTORNEY.

OIL FILTER IN CRANKCASE PAN

This invention relates to internal combustion engine lubricating oil filtering systems and more particularly to a filter arrangement wherein the filter is positioned in the crankcase pan within the oil sump.

One of the objects of this invention is to provide a lubricating oil filtering system for an internal combustion engine wherein the crankcase pan is apertured to receive a replaceable filter element with lubricating oil conduits all of which located within the confines of the crankcase pan.

The filtering arrangement for an internal combustion engine has long been considered an accessory and a filter device has been carried in a separate container mounted externally of the engine and connected by tubing to the lubricating system. This arrangement is suseptible to damage particularly when the engine is being handled externally of the vehicle.

Further the manufacturing costs of the engine is unnecessarily increased by the additional container and piping connections required to connect the oil pump through the filter of the oil system.

The disadvantage of the available systems are eliminated by the use of my apparatus wherein a cavity is stamped in the crankcase oil pan, a spin on type oil filter is positioned within the cavity, and threadably mounted on the suction line of the oil pump. The filter inlet is connected to the oil in the sump by a conduit which provides for a flooding the filter with oil and completes a circuit of the oil to the filter material from the crankcase to the pump. It will be noted that only filtered oil reaches the pump this reducing the wear on the pump as well as other engine parts since only filtered oil enters the system.

Accordingly, it is an object of this invention to provide an oil filtering apparatus for the crankcase of an internal combustion engine having a spin-on replaceable oil filter positioned within a cavity formed in the crankcase pan with oil conduits from the bottom of the sump to the inlet of the filter and from the outlet of the filter to the oil pump.

Another object of the invention is to provide a readily replacable filter element positioned within a cavity in the crankcase oil pan, said cavity opening downwardly to receive the filter element and having oil connections from the bottom of the sump to the oil filter inlet and from the oil filter outlet to the oil pump in the engine lubricating system.

A still further object of this invention is to provide an oil filtering system wherein a spin-on oil filter, readily replacable, is positioned within a cavity opening to the side of a crankcase pan and for an internal combustion engine and having a dip tube positioned near the bottom of the sump and connected to the inlet of the oil filter and a conduit from the oil filter outlet to the oil pump in the engine lubricating system.

Other objects and advantages more or less ancillary to the foregoing and the manner in which all the various objects are realized, will appear in the following description, which, considered in connection the accompanying drawings, set forth the preferred embodiment of the invention.

In the drawings:

FIG. 1 is a bottom view of the crankcase pan with the filter positioned in the recess formed in the bottom of the pan;

FIG. 2 is a sectional view of the assembly taken along line 2—2 of FIG. 1;

FIG. 3 is a side view of the engine pan showing the filter in place;

FIG. 4 is a side view of the engine pan with parts cut away to show the filter in place; and FIG. 5 is a fragmentary sectional view of the filter and conduit assembly wherein the screw-in filter is installed through the bottom of the pan.

Referring first to FIG. 1, an engine oil pan 10 is shown therein having a sump 12 in which a cavity 14 is made by stamping, said cavity 14 having sufficient volume to receive a conventional spin on filter element 16. The element 16 is positioned in such a manner that no part of the filter element 16 is outside the profile of the sump 12.

The filter 16 has an end plate 18 closing one end thereof, said plate 18 having a plurality of apertures 20 leading through the end plate to the interior of the filter 16 to provide an oil inlet means. A central threaded aperture 22 thread engages a conduit 24 and provides for readily replacing the filter 16 at regular intervals for maintenance purposes.

A gasket 26 circular in shape is carried by the wall 18 and engages end wall 28 of the cavity 14 and thereby prevents escape of oil being drawn into the filter and the introduction of dirt and contamination from the outside. When the filter 16 is screwed on the conduit 24, gasket 26 is compressed and an oil tight seal results.

Conduit 24 extends through the wall 28 and is welded thereto as shown in 30 or may be affixed by a nut and gasket. Conduit 24 is connected to an inlet of an oil pump (not shown) of the usual type provided for automotive use and supplying lubricating oil to the oil passages in the engine.

Line 32 is carried by the wall 28 and is in the nature of a dip tube having an end 34 spaced from the bottom of the oil sump 12 for conducting oil from the bottom of the pan 12 to the filter 16. The line 32 opens through the wall 28 to the annular space formed by gasket 26 and wall 18 and cavity wall 28. The oil passes through the tube 32 and into the filter by way of apertures 20 formed therein.

After the oil has passed through the filtering material in the filter 16 it is discharged through the conduit 24 and through the pump for circulation through the engine and returned to the sump 12. It is noted that the oil filter is positioned opposite the bottom of the sump in such a way that the level of the oil in the sump is sufficient to flood the filter. An oil drain 36 is provided on the sump 12 for removing the contents thereof when it is desired to change the lubricating oil in the system.

Alternate form of my invention is disclosed in FIGS. 4 and 5 wherein the engine oil pan 40, having a sump section 42 is provided with a recess 44 cylindrical in shape and having its axis in a generally vertical direction.

A threaded pipe 48 extends through an opening 50 in the upper end of the recess 44 and threadably receives a filter element 46 thereon. A gasket 51 generally circular lies between the upper end of the filter 46 and the end wall of the recess 44 and prevents the access of dirt and other contaminants to the oil within the lubrication circuit.

The pipe 48 is affixed to a connecting line 52, which is connected to the engine oil pump inlet (not shown) said line 52 having a shoulder 54 confronting the pan adjacent the recess 44. Spaced from the shoulder 54 a cup-shaped shroud 56 slightly larger than the recess 44 is positioned thereover resulting in an annular space between the shroud 56 and the recess 44, said annular space providing an oil inlet passage which functions as a dip tube and draws the oil from the bottom of the sump 42 and introduces the same to the filter. A plurality of apertures 58 are provided for an inlet space from the annular area to the filter element. The shroud 56 is spaced from the shoulder 54 by a gasket 60 and shroud 56 is further spaced from the end of the recess by gasket 62, the assembly being held together in leak-resistent relationship by a nut 64 threadably mounted on the threaded pipe 48.

Operation of the engine oil pump draws the oil through the annular space between the shroud 56 and the pan wall 44, through the apertures 58 into the oil filter 46. The cleaned and filtered oil passes out of the oil filter through the pipe 48, and into the pump inlet line 52.

Having thus described this invention in such full, clear, concise, and exact terms as to enable any person skilled in the art to which it pertains to make and use the same, and having set forth the best mode contemplated of carrying out this invention, I state that the subject which I regard as being my invention is particularly pointed out and distinctly claimed in what is claimed, it being understood that equivalents of modifications of, or substitutions for, parts of the above specifically described embodiments of the invention may be made without departing from the scope of the invention as set forth in what is claimed.

What is claimed is:

1. In an internal combustion engine having an oil pan and an oil pump, the improvement comprising an external recess formed in said pan and having a perforated flat wall, a conduit projecting through said wall, a spin-on replacement oil filter having the filtering material enclosed in a housing having a perforate end and threadably received on said conduit, and a gasket engagable with said wall and said filter housing and spaced from said conduit and surrounding the perforations in said end, an inlet means near the bottom of said pan and spaced therefrom, and opening into the space between the gasket and the conduit and lying between said wall and said filter, said conduit being connected to the inlet of the oil pump carried by said internal combustion engine for circulating oil through the lubrication system.

2. The filter of claim 1 wherein the pan recess is formed in the pan with the axis of the filter element generally horizontal.

3. The filter of claim 2 wherein the inlet means comprises a dip tube having the inlet end spaced from and near the bottom of the pan and having the outlet between the conduit and the gasket.

* * * * *